United States Patent
Dunne et al.

(10) Patent No.: US 6,973,963 B2
(45) Date of Patent: Dec. 13, 2005

(54) ADSORBER GENERATOR FOR USE IN SORPTION HEAT PUMP PROCESSES

(75) Inventors: Stephen R. Dunne, Algonquin, IL (US); Steven A. Bradley, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/989,153

(22) Filed: Nov. 15, 2004

(65) Prior Publication Data
US 2005/0061483 A1  Mar. 24, 2005

Related U.S. Application Data

(63) Continuation of application No. 10/443,330, filed on May 22, 2003, now abandoned.

(51) Int. Cl.[7] .............................................. F28D 15/00
(52) U.S. Cl. ................................... 165/104.12; 62/480
(58) Field of Search ................................ 165/146, 133, 165/170, 104.12, 172–176; 62/477, 480

(56) References Cited

U.S. PATENT DOCUMENTS

| | | | |
|---|---|---|---|
| 4,138,850 A | 2/1979 | Tchernev | 60/641 |
| 4,509,592 A | 4/1985 | Yamada et al. | 165/166 |
| 4,548,046 A | 10/1985 | Brandon et al. | 62/79 |
| 4,637,218 A | 1/1987 | Tchernev | 62/106 |
| 4,665,973 A | 5/1987 | Limberg et al. | 165/133 |
| 5,203,402 A | 4/1993 | Nishishita et al. | 165/133 |
| 5,366,004 A | 11/1994 | Garner et al. | 165/133 |
| 5,470,431 A | 11/1995 | Okuda et al. | 159/28.6 |
| 5,477,705 A | 12/1995 | Meunier | 62/480 |
| 5,518,977 A | 5/1996 | Dunne et al. | 502/68 |
| 5,585,145 A | 12/1996 | Maier-Laxhuber et al. | 427/380 |
| 5,650,221 A | 7/1997 | Belding et al. | 442/417 |
| 5,732,569 A * | 3/1998 | Sanada et al. | 62/481 |
| 6,102,107 A | 8/2000 | Dunne | 165/104.12 |
| 6,604,573 B2 | 8/2003 | Morishima et al. | 165/153 |

FOREIGN PATENT DOCUMENTS

| | | | | |
|---|---|---|---|---|
| JP | 62-172196 A | 7/1987 | | 165/133 |
| JP | 4-225762 A | 8/1992 | | 62/481 |
| JP | 4-288494 A | 10/1992 | | 165/133 |
| JP | 6-58644 A | 3/1994 | | 62/324.2 |
| JP | 6-82116 A | 3/1994 | | 62/324.2 |

* cited by examiner

*Primary Examiner*—Terrell Mckinnon
(74) *Attorney, Agent, or Firm*—John G. Tolomei; Mark Goldberg

(57) ABSTRACT

This invention provides a compact heat exchanger that has an effective geometry for heat transfer operations regardless of the heat conductivity of the material chosen for the fin materials. It has further been found that the use of adsorbent coated anodized aluminum for fin materials provides for a very efficient heat exchanger.

16 Claims, 2 Drawing Sheets

ADSORBER GENERATOR FOR USE IN SORPTION HEAT PUMP PROCESSES

CROSS-REFERENCE TO RELATED APPLICATION

This application is a Continuation of application Ser. No. 10/443,330 filed May 22, 2003, now abandoned, the contents of which are hereby incorporated by reference in its entirety.

BACKGROUND OF THE INVENTION

The present invention relates to an apparatus for use in adsorption and desorption based sorption heat pump processes. Sorption heat pump processes typically employ some adsorbent disposed in a metal vessel and on a metal screen or surface which provides support for the adsorbent and permits the adsorbent to be placed in contact with the fluid stream containing the adsorbable component over the range of conditions necessary for the adsorption and desorption. The metal structures and physical arrangement of these devices has placed certain process limitations which restrict the amount of adsorbent which actually comes in contact with the fluid stream, or is accompanied by heat transfer inefficiencies inherent in the disposition of the adsorbent.

In the operation of sorption heat pump systems, generally there are two or more solid beds containing a solid adsorbent. The solid adsorbent beds desorb refrigerant when heated and adsorb refrigerant vapor when cooled. In this manner the beds can be used to drive the refrigerant around a heat pump system to heat or cool another fluid such as a process stream or to provide space heating or cooling. In the heat pump system, commonly referred to as the heat pump loop, or a sorption refrigeration circuit, the refrigerant is desorbed from a first bed as it is heated to drive the refrigerant out of the first bed and the refrigerant vapor is conveyed to a condenser. In the condenser, the refrigerant vapor is cooled and condensed. The refrigerant condensate is then expanded to a lower pressure through an expansion valve and the low pressure condensate passes to an evaporator where the low pressure condensate is heat exchanged with the process stream or space to be conditioned to revaporize the condensate. When further heating no longer produces desorbed refrigerant from the first bed, the first bed is isolated and allowed to return to the adsorption conditions. When the adsorption conditions are established in the first bed, the refrigerant vapor from the evaporator is reintroduced to the first bed to complete the cycle. Generally two or more solid adsorbent beds are employed in a typical cycle wherein one bed is heated during the desorption stroke and the other bed is cooled during the adsorption stroke. The time for the completion of a full cycle of adsorption and desorption is known as the "cycle time." The upper and lower temperatures will vary depending upon the selection of the refrigerant fluid and the adsorbent. Some thermodynamic processes for cooling and heating by adsorption of a refrigerating fluid on a solid adsorbent use zeolite and other sorption materials such as activated carbon and silica gel. U.S. Pat. No. 4,138,850 relates to a system for solar heat utilization employing a solid zeolite adsorbent mixed with a binder, pressed, and sintered into divider panels and hermetically sealed in containers. U.S. Pat. No. 4,637,218 relates to a heat pump system using zeolites as the solid adsorbent and water as the refrigerant wherein the zeolite is sliced into bricks or pressed into a desired configuration to establish a hermetically sealed space and thereby set up the propagation of a temperature front, or thermal wave through the adsorbent bed. U.S. Pat. No. 5,477,705 discloses an apparatus for refrigeration employing a compartmentalized reactor and alternate circulation of hot and cold fluids to create a thermal wave which passes through the compartments containing a solid adsorbent to desorb and adsorb a refrigerant. U.S. Pat. No. 4,548,046 relates to an apparatus for cooling or heating by adsorption of a refrigerating fluid on a solid adsorbent. The operations employ a plurality of tubes provided with parallel radial fins, the spaces between which are filled or covered with solid adsorbent such as Zeolite 13X located on the outside of the tubes. U.S. Pat. No. 5,518,977, which is hereby incorporated by reference, relates to sorption cooling devices which employ adsorbent coated surfaces to obtain a high cooling coefficient of performance.

U.S. Pat. No. 5,585,145 discloses a method for providing an adsorbent coating on a heat exchanger which comprises applying a flowable emulsion including a binder agent, water and a solid adsorbent material to the surface of the heat exchanger. The disclosure states that the binder can be an adhesive and that the thickness of the adsorbent coating can be dipped, painted or sprayed with a drying step comprising heating the layer at temperatures greater than 150° C. in order to obtain a durable adsorbent coating structure.

Many sorption chillers are designed with beads or extrudate as an adsorbent. In the present invention, as in U.S. Pat. No. 6,102,107, there are no beads or extrudates with their resistance to heat transfer, but instead there is a compact heat exchanger module that comprises a laminate of adsorbent, especially zeolite, in a polymeric or polymeric fiber matrix. This laminate is on a substrate that can support the laminate and can be employed in the hot and wet environment of the adsorber/generator.

U.S. Pat. No. 6,102,107, incorporated herein in its entirety, teaches the use of a plate-fin-tube arrangement employing a laminate composed of thin polymeric fiber matrix on a metallic fin structure. Conventional tubing is laced through the fins by punching holes in the fin structure and forming collars of the fin metal that are maintained in intimate thermal contact with the tube surfaces. While this patent provided for greatly increased heat transfer and was a significant advance in the design and performance of adsorber/generators in sorption based heat pumps, it failed to deal with the problem of maximizing heat transfer when materials other than high thermal conductivity fin plates are used.

In addition to the problem of heat transfer resistance in some materials, a second potential problem arises when clean, uncoated aluminum is exposed to water vapor under vacuum conditions. This is the problem of corrosion of the aluminum surface and formation of AlOH radicals on the surface. This reaction liberates hydrogen gas and is a cause for the loss of vacuum under some conditions that may be present in the adsorber/generator of a sorption cooler or heat pump. Stainless steel could be used to solve this deficiency, but the low conductivity of stainless steel changes the heat transfer resistance. This makes adsorber/generators made from stainless steel incapable of transferring the required heat and can result in structures that are much more costly and only slightly more efficient than packed bed systems. One feature of the present invention is to allow for the use of aluminum with its superior heat transfer properties but without the corrosion problems of the prior art heat exchangers.

It is an object of the instant invention to provide an improved compact heat exchanger with the adsorbent matrix bonded directly to the plates. It is a further object of the invention to enable the application of a thin uniform layer of adsorbent material which is intimately bonded to a heat transfer surface. Another object of the present invention is to enable a rapid heating and cooling cycle with the purpose of achieving a high specific power and a high coefficient of performance for the sorption cooling cycle. Yet another object of the present invention is to provide a heat exchanger geometry that is effective regardless of the heat conductivity of the fin material that is chosen.

SUMMARY OF THE INVENTION

The present invention relates to a highly efficient sorption heat pump module apparatus for use in sorption heat pump processes which can be used effectively with a rapid cooling and heating cycle. A sorption heat pump exchanger module is employed comprising a plurality of metallic plates having a first and a second opposing side and an adsorbent coating covering essentially the entire surface of said first opposing side and wherein a first and a second of said metallic plates are grouped together to form a sub-unit having a passageway between said two metallic plates for passage of a heat exchange media and wherein a plurality of said sub-units are spaced apart in a stacked arrangement that eliminates contact between said sub-units; a plurality of tubes contacting said sub-units wherein a heat exchange medium flows within said tubes to and from openings in said tubes to openings in said sub-units, and a passageway between each of said sub-units wherein a refrigerant flows within said passageway.

In some embodiments of the invention, it has been found that the use of metallic plates comprising a corrosion resistant aluminum such as anodized aluminum provides for a highly efficient heat exchanger that withstands corrosion. More specifically, the sorption heat pump exchanger module comprises a plurality of anodized aluminum fin plates having a first and second opposing sides and an adsorbent coating comprising at least one adsorbent selected from the group consisting of zeolite X, Zeolite Y, Zeolite A, silica gel, silicas, aluminas and mixtures thereof. The adsorbent coating covers essentially the entire surface of each opposing side to form coated fin plates and the fin plates are spaced apart in a stacked arrangement that eliminates adsorbent bridging between all coated surfaces. There are at least 300 coated fin plates for every meter of the stacked arrangement. A plurality of tubes extend through openings in the fin plates wherein the outside of the plurality of tubes directly contacts the periphery of the openings to form the sorption heat pump exchanger module defining a first flow path for a heat exchange medium in the plurality of tubes and a second flow path for a refrigerant between said coated fin plates.

In another embodiment of the present invention, a sorption heat pump exchanger module comprises a plurality of anodized aluminum fin plates having a first and second opposing sides and an adsorbent coating covering essentially the entire surface of each opposing side. There are a plurality of openings defined by the anodized aluminum fin plates and extending through the anodized aluminum fin plates and coating. A plurality of tubes that have uncoated outer walls extend transversely through the anodized aluminum fin plates and have direct contact with the anodized aluminum fin plates being spaced apart in a stacked arrangement that eliminates adsorbent bridging between all coated surfaces and contain at least 300 anodized aluminum fin plates for every meter of the stacked arrangement. The plurality of tubes extend through the openings in the anodized aluminum fin plates wherein the outside of said plurality of tubes directly contact the periphery of the openings to form the sorption heat pump exchanger module defining a first flow path for a heat exchange medium in said plurality of tubes and a second flow path for a refrigerant between said coated anodized aluminum fin plates. The adsorbent is selected from the group consisting of Zeolite X, Zeolite Y, Zeolite A, silica gel, silicas, aluminas and mixtures thereof.

In yet other embodiments of the present invention, the sorption heat pump exchanger module comprises a plurality of fin plates, having a first side and a second side opposite said first side wherein said fin plates are approximately rectangular in shape. The fin plates have two long edges and two short edges. An adsorbent coating covers a majority of the first side and the second side, except where there is a gap in the adsorbent coating extending from one of the long edges to the other of the long edges. The fin plates are bent along the gaps to form a corrugated structure and the fin plates contact a top and a bottom outside surface of a pair of parallel heat transfer passages. This structure has been found to have highly effective heat transfer properties.

DETAILED DESCRIPTION OF THE INVENTION

Figure 1:
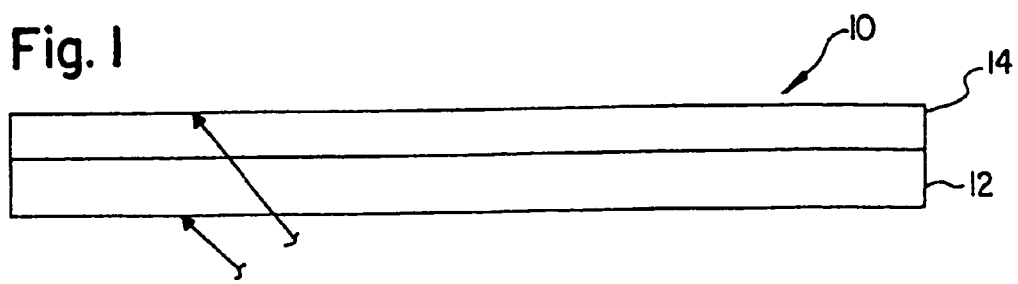
FIG. 1 is a view of a single-sided laminate of a zeolite-containing matrix bonded to a substrate.

In the present invention, the adsorption zone is comprises thin sheets of adsorbent paper layers bonded to a substrate. For sorption heat pump processes, the adsorption zone comprises a plurality of such plates disposed on tubes to form a tube and flat plate heat exchanger. The adsorbent layer comprises an adsorbent paper layer. An example of the type of adsorbent paper layer for use in the present invention is disclosed in U.S. Pat. No. 5,650,221 which is hereby incorporated by reference. The adsorbent paper layer of U.S. Pat. No. 5,650,221 is comprised of an improved support material, fibrous material, binders, and high levels of desiccant or adsorbent material. The fibrous materials include cellulosic fibers, synthetic fibers and mixtures thereof. Fibrillated fibers, that is, fiber shafts which are split at their ends to form fibrils, i.e., fine fibers or filaments much finer than the fiber shafts are preferred. Examples of fibrillated, synthetic organic fibers useful in the adsorbent paper of the present invention are fibrillated aramid and acrylic fibers. A particularly preferred example of such a fiber is available from E.I. du Pont de Nemours & Company under the designation KEVLAR®. The desiccant or adsorbent may be incorporated therein during fabrication of the paper, or the paper may be formed and the desiccant or adsorbent coated thereon, or a combination of adsorbent incorporation during paper making and coating with adsorbent thereafter may be used. As the thickness of the adsorbent paper increases up to an optimal value, the capacity for heating will be increased. However, since cost also increases with increasing thickness, a balance between heating capacity and cost is necessary. Preferably, the adsorbent paper of the present invention comprises a thickness of from about 0.13 to about 0.75 mm and comprises at least 50 wt-% adsorbent. More preferably, the adsorbent paper comprises from about 0.25 to about 0.6 mm in thickness and comprises more than about 70 wt-% adsorbent. Most preferably, the adsorbent paper is about 0.5 mm in thickness and comprises more than 70 wt-% adsorbent. The adsorbent can be any material capable of adsorbing an adsorbable component such as a refrigerant. The adsorbent may comprise powdered solid, crystalline compounds capable of adsorbing and desorbing the adsorbable compound. Examples of such adsorbents include silica gels, activated aluminas, activated carbon, molecular sieves and mixtures thereof. Molecular sieves include zeolite molecular sieves. Other materials which can be used as adsorbents include halogenated compounds such as halogen salts including chloride, bromide, and fluoride salts as examples. The preferred adsorbents are zeolites. Preferably, at least 70 wt-% of the adsorbent paper is a zeolite molecular sieve.

The pore size of the zeolitic molecular sieves may be varied by employing different metal cations. For example, sodium zeolite A has an apparent pore size of about 4 Å units, whereas calcium zeolite A has an apparent pore size of about 5 Å units. The term "apparent pore size" as used herein may be defined as the maximum critical dimension of the molecular sieve in question under normal conditions. The apparent pore size will always be larger than the effective pore diameter, which may be defined as the free diameter of the appropriate silicate ring in the zeolite structure. Zeolitic molecular sieves in the calcined form may be represented by the general formula:

$$Me_{2/n}O:Al_2O_3:xSiO_2:yH_2O$$

where Me is a cation, x has a value from about 2 to infinity, n is the cation valence and y has a value of from about 2 to 10. The general formula for a molecular sieve composition known commercially as type 13X is:

$$1.0\pm0.2Na_2O:1.00Al_2O_3:2.5\pm0.5SiO_2$$

plus water of hydration. Type 13X has a cubic crystal structure which is characterized by a three-dimensional network with mutually connected intracrystalline voids accessible through pore openings which will admit molecules with critical dimensions up to 10 Å. The void volume is 51 vol-% of the zeolite and most adsorption takes place in the crystalline voids. Typical well-known zeolites which may be used include chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having high silica content. The adsorbent can be selected from the group consisting of DDZ-70, Y-54, Y-74, Y-84, Y-85, low cerium mixed rare earth exchanged Y-84, calcined rare earth exchanged LZ-210 at a framework $SiO_2/Al_2O_3$ mol equivalent ratio of less than about 7.0 and mixtures thereof.

The appropriate adsorbent to be selected is dependent upon the planned operating conditions of the heat pump containing the sorption heat pump exchangers of the present invention. Among the factors determining the choice of adsorbent is the source of and amount of power for the heat pump, the desired regeneration temperature and the general climatic conditions that occur where the heat pump will be used. For example, at higher regeneration temperatures, zeolite (X) (from an $Si/Al_2$ ratio of 2.3 and up) or zeolite (Y) (from an $Si/Al_2$ ratio of 5 and up) are more effective due to higher heat of adsorption and the resulting greater ability to obtain high loading at relatively high adsorption temperatures. When the regeneration temperature and adsorption temperature are both relatively low, then the preferred adsorbent type is zeolite DDZ-70 (available from UOP LLC, Des Plaines, Ill.) due to its low heat of adsorption and consequently its ability to regenerate at relatively low temperatures.

For example, when the regeneration temperature and the condensing and adsorption temperatures are below 40° to 50° C., then the DDZ-70 zeolite is a good choice of adsorbent. At higher temperatures such as about 150° C., regeneration temperature and adsorption temperature above 50° C., NaY zeolite works well.

A heat transfer fluid, such as a cold fluid to cool the adsorption zone to adsorption conditions of adsorption temperature, is introduced at a cold fluid temperature into the heat transfer zone. A hot heat transfer fluid is introduced to the heat transfer zone, when required to raise the temperature of the adsorption zone to desorption conditions such as a desorption temperature. The cold heat transfer fluid and the hot heat transfer fluid may be selected from the group consisting of water, alcohols, ammonia, light hydrocarbons, chloro-fluorocarbons, fluorocarbons, and mixtures thereof. Water is a preferred heat transfer fluid. Similarly, for sorption heat pump operations, a refrigerant is selected from the group consisting of water, alcohols, ammonia, light hydrocarbons, chloro-fluorocarbons, fluorocarbons, and mixtures thereof. It is preferred that the heat transfer fluids and the refrigerants not react with the materials of the heat transfer surface. Additives and inhibitors such as amines can be added to the heat transfer fluids to pacify or inhibit such reactions.

In the operation of the sorption heat pump system of the present invention, a portion of the adsorbent zones may be in an adsorption mode, an intermediate mode, or a desorption mode. In the typical installation, at least one portion of the adsorbent zones will generally be active in each of the operating modes at any given time in order to provide a continuous process. The desorption mode comprises a desorption temperature ranging from about 80° to about 350° C. and a desorption pressure ranging from about 2 kPa to about 1.5M Pa (220 psia).

The sorption zone may be operated with a variety of sorbent/refrigerant combinations or pairs. Examples of pairings of such sorbent/refrigerant pairs include zeolite/water, zeolite/ethanol, zeolite/methanol, carbon/ethanol, zeolite/ammonia, zeolite/propane and silica gel/water. The operating conditions will vary with the selection of the sorbent/refrigerant pair.

DETAILED DESCRIPTION OF THE DRAWINGS

FIG. 1 shows a single-sided laminate 10 having at least two layers including a substrate layer 12 and an adsorbent-containing layer 14. The adsorbent layer comprises an adsorbent. Preferably, the adsorbent is selected from the group consisting of zeolite X, zeolite Y, zeolite A, silica gel, silicas, aluminas, and mixtures thereof. More preferably, the adsorbent is selected from the group consisting of zeolite Y-54, zeolite Y-74, zeolite Y-84, zeolite Y-85, steam condensed rare earth exchanged Y-54, low cerium rare earth exchanged Y-84, low cerium rare earth exchanged zeolite LZ-210, zeolite DDZ-70 and mixtures thereof. Most preferably, the adsorbent is selected from the group consisting of zeolite Y having a trivalent cation in the β-cage of the zeolite structure. The adsorbent layer may be formed by conventional coating methods such as slip coatings, dipping, spray coating, curtain coating, and combinations thereof. One preferred method of forming an adsorbent layer on the fin plate is by applying a layer of adsorbent paper such as disclosed herein above wherein the paper contains the adsorbent in a uniform layer. The adsorbent paper layer may be laminated to the fin plates by any means such as a heat and moisture resistant adhesive-like epoxy. By applying the adsorbent layer to the fin plate prior to assembly of the sorption heat pump module, the build-up or flooding of adsorbent at the root where the tube contacts the fin plate is avoided. Typically, the adsorbent paper layer has a thickness of between about 0.25 and about 0.6 mm. For layers of this thickness, stacked arrangements of fin plates having from about 300 to about 800 fin plates per meter of tube length may be assembled. The arrangements of fin plates in each of the embodiments of the present invention is optimized for heating power and cost factors. In particular, the fin thickness, fin material, and fin spacing as well as the thickness of the adsorbent layer are optimized to minimize the cost while maximizing the performance of an adsorption heat pump. Fins that are thicker than the optimal thickness will not provide the desired heat transfer. The fins need to be properly spaced for ease of refrigerant flow. One optimal arrangement consisted of 0.31 mm (0.012 inch) thick aluminum fins with 0.51 mm (0.02 inch) thick adsorbent media.

Figure 2:
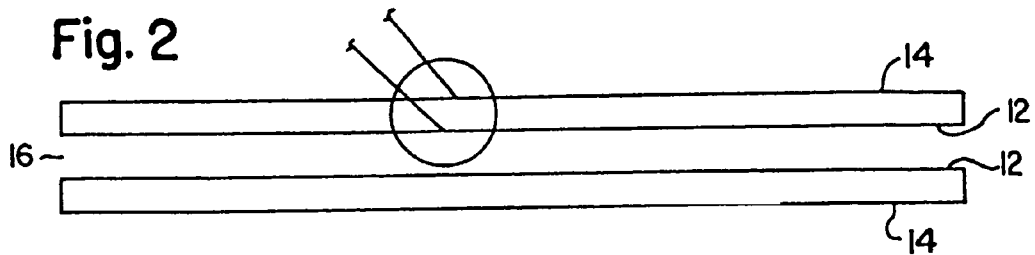
FIG. 2 is a cross-sectional view of a pair of single-sided laminates mated together with a heat transfer channel between the two laminates.

FIG. 2 shows a pair of the single-sided laminates of FIG. 1 oriented so that the substrate layers 12 are facing within each pair of single-sided laminates. A heat transfer channel 16 is between each pair of single-sided laminates.

Figure 3:
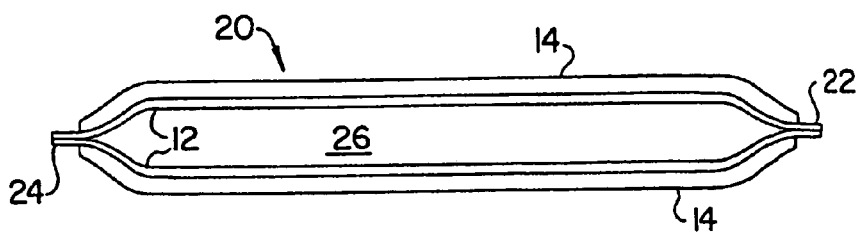
FIG. 3 shows a view of the heat transfer passageway between two layers of the laminate of the present invention.

FIG. 3 shows an alternate embodiment of the invention wherein two single-sided laminates are corrugated and then mated together to form flow channels for a refrigerant within a subassembly 20. The subassembly 20 that is formed is sealed at two or three of the four edges. Sealed edges 22, 24 are shown. In the perspective shown in FIG. 3, a heat transfer fluid would flow in and out of the plane as shown in a heat transfer passage 26. In the embodiment shown, the uncoated substrate layer 12 is on the interior of the subassembly 20 and the adsorbent-containing layer 14 is on the outside of the subassembly 20 as shown.

Figure 4:
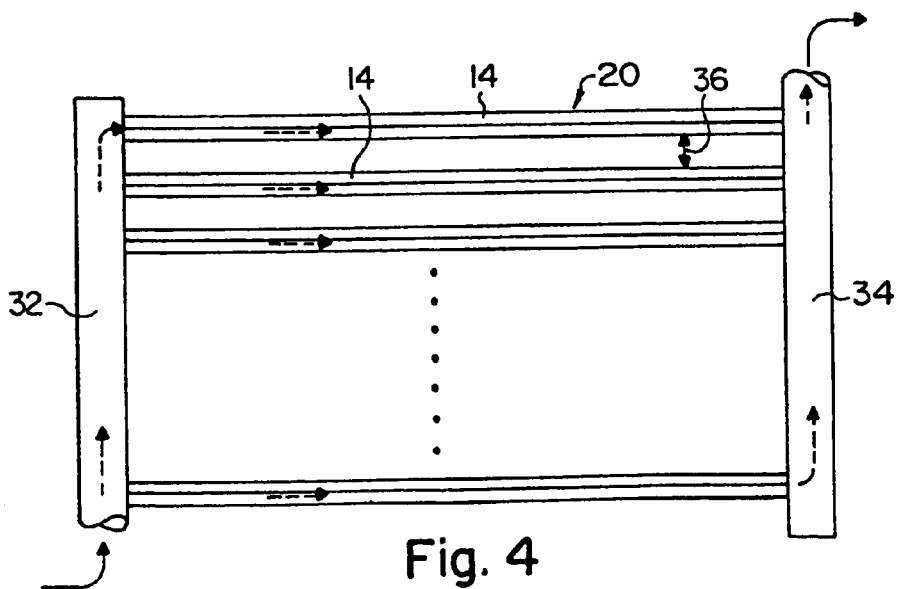
FIG. 4 shows an assembly of repeating units of the units shown in FIG. 3.

FIG. 4 shows a view of the subassemblies 20 of FIG. 3 arranged into an assembly 30. The subassembly 20 has been turned so that the flow path of the heat transfer fluid is now across the side having the adsorbent layer. Arrows show the direction of flow of the heat transfer fluid. An inlet header 32 and an outlet header 34 mate and seal to openings at both ends of subassembly 20 and allow for flow of heat transfer fluid up the headers and across inside surfaces of subassembly 20. In a heat pump, the entire assembly displayed in FIG. 3 is placed inside a vacuum vessel and spaces 36 between the subassemblies 20 contain the refrigerant that also fills the open portions of the vacuum surrounding the assembly. The primary surface area for heat transfer is the entire inside surface of all the subassemblies 20.

Figure 5:
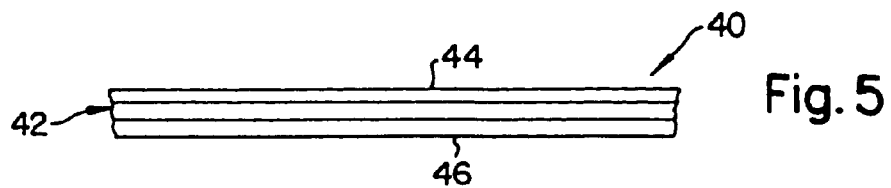
FIG. 5 shows a double-sided laminate of a zeolite-containing matrix bonded to both sides of a substrate.

FIG. 5 shows a double-sided laminate 40 that comprises a single sheet 42 of a base material, such as aluminum and layers 44, 46 of a zeolite matrix bonded to each opposing surface of the base material.

Figure 6:
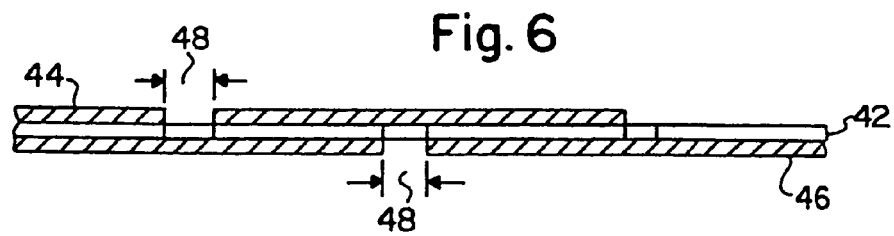
FIG. 6 shows an embodiment of the invention having gaps in the lamination to allow for bonding of a surface to an adjacent heat transfer passage.

FIG. 6 shows a special arrangement of the double-sided laminate of FIG. 5 where there are gaps 48 in the layers 44, 46 so as to allow for corrugation that will leave uncoated (nonlaminated) sections of the base material exposed. The presence of these gaps allows for bonding of the nonlaminated sections of the laminate to the outside surface of a heat transfer passage.

Figure 7:
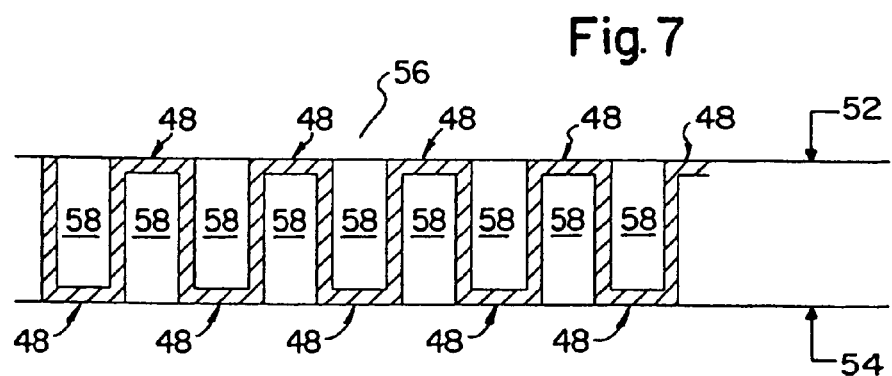
FIG. 7 shows how the uncoated gaps in the structure shown in FIG. 6 are mated to the outside of heat transfer surfaces.

FIG. 7 shows how the gaps 48 are mated to outside surfaces 52, 54 of heat transfer fluid passages in a unit 56. A refrigerant 58 is shown flowing next to the laminate. The double-sided laminate of FIG. 6 is shown in a corrugated pattern to maximize surface area.

Figure 8:
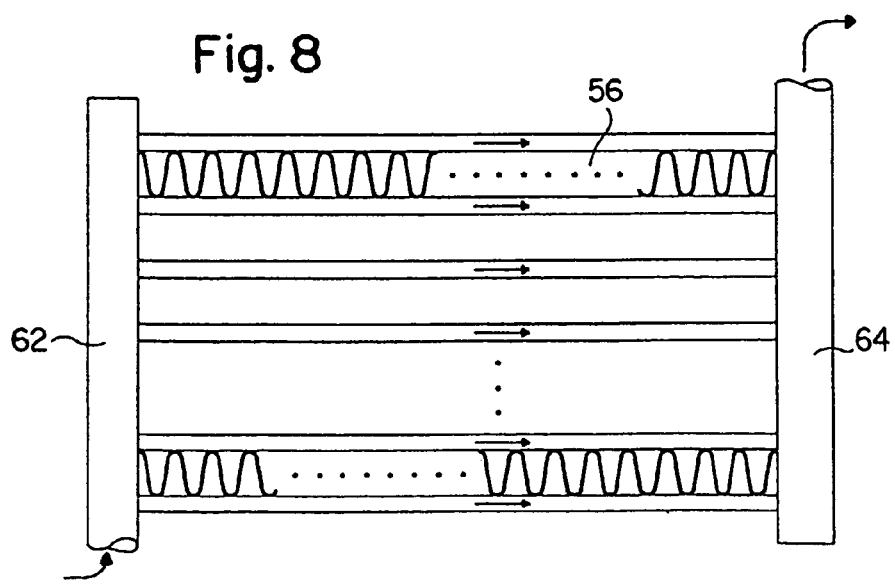
FIG. 8 shows a combination of the heat transfer passage assembly of FIG. 4 with the addition of fin stock bonded to the outside surfaces of the heat transfer surfaces.

FIG. 8 shows how the repeating units of a heat transfer passage with fin stock bonded to the outside surfaces of the heat transfer passage as in FIG. 7 are stacked to form an entire heat exchanger. An inlet header 62 and an outlet header 64 are shown for flow of the heat exchange fluid to the heat transfer fluid passages of unit 56. This design combines the advantage of large fin surface with the compact style heat exchanger that has a large primary surface area. In one embodiment of FIG. 8, the metal layers are aluminum plates that have been anodized to prevent any potential corrosion reactions with water. The anodizing step is carried out prior to the lamination and assembly of the heat exchanger core.

What is claimed is:

1. A sorption heat pump exchanger module comprising:
   a) a plurality of metallic plates having a first and a second opposing side and an adsorbent coating covering essentially the entire surface of said first opposing side wherein said adsorbent coating comprises a layer of adsorbent paper and wherein a first and a second of said metallic plates are grouped together to form a sub-unit having a passageway between said two metallic plates for passage of a heat exchange media and wherein a plurality of said sub-units are spaced apart in a stacked arrangement that eliminates contact between said sub-units;
   b) a plurality of tubes contacting said sub-units wherein a heat exchange medium flows within said tubes to and from openings in said tubes to openings in said sub-units wherein there are gaps in said adsorbent coating adjacent said tubes; and
   c) a passageway between each of said sub-units wherein a refrigerant flows within said passageway.

2. The sorption heat pump exchanger module of claim 1 wherein said first opposing side of said first metallic plate faces the first opposing side of said second metallic plate within each of said sub-units.

3. The sorption heat pump exchanger module of claim 1 wherein said second opposing side of said first metallic plate faces said second opposing side of said second metallic plate within each of said sub-units.

4. The sorption heat pump exchanger module of claim 1 wherein said metallic plates have an adsorbent coating covering essentially the entire surface of said second opposing side.

5. The sorption heat pump exchanger module of claim 1 wherein within said sub-units, said first metallic plate contacts said second metallic plate on each of two edges to form a seal to form said passageway for said heat transfer medium and wherein said metallic plates are curved to form said passageway.

6. The sorption heat pump exchanger module of claim 1 wherein said adsorbent coating comprises an adsorbent selected from the group consisting of zeolite X, Zeolite Y, Zeolite A, silica gel, silicas, aluminas and mixtures thereof.

7. The sorption heat pump exchanger module of claim 1 wherein said adsorbent coating comprises a layer comprising zeolite Y selected from the group consisting of zeolite Y-54, zeolite Y-74, zeolite Y-84, steam calcined rare earth exchanged Y-54, zeolite Y-85, low cerium rare earth exchanged Y-84, low cerium rare earth exchanged zeolite LZ-210 and zeolite DDZ-70.

8. The sorption heat pump exchanger module of claim 1 wherein the refrigerant and the heat transfer fluid are selected from the group consisting of water, alcohols, ammonia, light hydrocarbons, chloro-fluorocarbons, fluorocarbons and mixtures thereof.

9. The sorption heat pump exchanger module of claim 1 wherein said substrate comprises anodized aluminum.

10. The sorption heat pump exchanger module of claim 1 wherein said adsorbent coating covers essentially the entire surface of both opposing sides of said metallic plates.

11. The sorption heat pump exchanger module of claim 1 wherein within said sub-units, said first metallic plate contacts said second metallic plate on each of two edges to form a seal to form said passageway for said heat transfer medium and wherein said metallic plates are curved to form said passageway.

12. A sorption heat pump exchanger module comprising:
  a) a plurality of fin plates, having a first side and a second side opposite said first side wherein said fin plates are approximately rectangular in shape, and wherein said fin plates have two long edges and two short edges;
  b) an adsorbent paper covering a majority of said first side and said second side, wherein a gap in said adsorbent coating extends from one of said long edges to the other of said long edges and wherein gaps in said adsorbent coating are positioned to allow bonding of a heat transfer passage to said fin plates at said gaps;
  c) wherein said fin plates are bent along said gaps to form a corrugated structure; and
  d) wherein said fin plates contact a top and a bottom outside surface of a pair of parallel heat transfer passages.

13. The sorption heat pump exchanger module of claim 12 wherein said adsorbent coating comprises an adsorbent selected from the group consisting of zeolite X, Zeolite Y, Zeolite A, silica gel, silicas, aluminas and mixtures thereof.

14. The sorption heat pump exchanger module of claim 12 wherein said adsorbent coating comprises a layer comprising zeolite Y selected from the group consisting of zeolite Y-54, zeolite Y-74, zeolite Y-84, zeolite Y-85, low cerium rare earth exchanged Y-84, low cerium rare earth exchanged zeolite LZ-210 and zeolite DDZ-70.

15. The sorption heat pump exchanger module of claim 12 wherein the refrigerant and the heat transfer fluid are selected from the group consisting of water, alcohols, ammonia, light hydrocarbons, chloro-fluorocarbons, fluorocarbons and mixtures thereof.

16. The sorption heat pump exchanger module of claim 12 wherein said substrate comprises anodized aluminum.

\* \* \* \* \*